United States Patent [19]

Eloy et al.

[11] 4,398,090
[45] * Aug. 9, 1983

[54] PANORAMIC ION DETECTOR

[75] Inventors: Jean-Francois Eloy, Saint Ismier, France; Eberhard Unsöld, Munich, Fed. Rep. of Germany

[73] Assignees: Commissariat a l'Energie Atomique, Paris, France; Gesellschaft fur Strahlen und Umweltforschung mbH, Neuherberg, Fed. Rep. of Germany

[ * ] Notice: The portion of the term of this patent subsequent to Mar. 30, 1999, has been disclaimed.

[21] Appl. No.: 310,995

[22] Filed: Oct. 13, 1981

Related U.S. Application Data

[63] Continuation of Ser. No. 958,724, Nov. 8, 1978, abandoned.

[30] Foreign Application Priority Data

Nov. 15, 1977 [FR] France ................................. 77 34271
Nov. 23, 1977 [FR] France ................................. 77 35185

[51] Int. Cl.³ ............................................. B01D 59/44
[52] U.S. Cl. ..................................... 250/299; 250/399
[58] Field of Search ............... 250/368, 299, 298, 287, 250/281, 282, 396 R, 397, 399, 363, 369; 313/94, 103 R, 104

[56] References Cited

U.S. PATENT DOCUMENTS

| | | | |
|---|---|---|---|
| 3,041,453 | 6/1962 | Daly | 250/389 |
| 3,538,328 | 11/1970 | Strausser | 250/399 |
| 3,916,187 | 10/1975 | Roy | 250/287 |
| 4,322,629 | 3/1982 | Eloy et al. | 250/299 |

Primary Examiner—Bruce C. Anderson

[57] ABSTRACT

Panoramic detector of ions spatially distributed in different beams, comprising a plane symmetry diaphragm having an opening permitting the passage of the beams and which is brought to earth potential, an electrode for converting ions into electrons having an opening facing the diaphragm opening, the conversion electrode having the same plane of plane symmetry and being brought to a negative potential relative to the earth potential, and a planar electrode facing the conversion electrode and brought to a positive potential relative to the potential of the conversion electrode, the face of the conversion electrode facing the planar electrode having a predetermined shape in such a way that the electron beams formed retain the same spatial distribution as the beams of ion to be detected in the presence of an applied magnetic field.

7 Claims, 2 Drawing Figures

PANORAMIC ION DETECTOR

This is a continuation of application Ser. No. 958,724, filed Nov. 8, 1978 abandoned.

BACKGROUND OF THE INVENTION

The present invention relates to a panoramic ion detector. This detector may be used for the detection of charged particles, particularly in mass spectrography.

For a considerable period of time, the only charged particle detector having a panoramic collection has been the photographic plate. This type of detector has certain advantages such as a good spatial resolution which is below 10 microns and a relatively good detection sensitivity, of the order of $10^6$ ions/mm$^2$.

However, this photographic detector has serious disadvantages and particularly difficulties of production and use whereby developing, recording and the calibration curves of the photographic plates involve a considerable amount of time.

Certain physical phenomena which produce charged particles last a very short time. In certain cases, the study of these phenomena require the use of a particle detector with a very rapid response. In this case, it is known to use a photomultiplier whose response is very rapid. This photomultiplier has a collection and detection window which is only sensitive to direct photon impact. In this case, it is therefore necessary to interpose a charged particle-photon conversion system between the emission source of these charged particles and the photomultiplier. This conversion system generally comprises a scintillator which effects the conversion in a very short time (approximately 1 nanosecond). Therefore, this conversion does not significantly modify the response speed of the photomultiplier, but this system can obviously only be used when the particles to be detected are electrons.

When the charged particles are positive ions for example, it is then necessary to have a supplementary conversion system making it possible to convert the positive ions into electrons, so as to be able to effect the electronphoton conversion by means of the scintillator.

It is known to convert the ions into electrons by different means, all of which involve the use of methods for the reemission of electrons by a surface bombarded with positive ions. The following are examples of such methods:

- a detector using an electrical conversion wire, which captures or traps the positive ions passing in its attractive electrical field, then reemitting secondary electrons as a result of this impact;
- a detector which uses a microchannel plate whose ends have a significant potential difference. These microchannels capture or trap the ions and convert them into electrons, while also having the effect of amplifying the electrons. Such a plate makes it possible to obtain a high speed panoramic ion—electron—photon converter system. The microchannels are juxtaposed in the plate and ions—electron conversion takes place when an ion to be detected strikws the inner wall of a plate channel. In general, this microchannel plate is placed at an angle of incidence of 20° relative to the ion beams. The plate has thousands of very small channels, for example with a diameter of 12 microns. These channels are very close to one another but, despite this proximity, joints which are blind to the beam of ions exist between each of the channels. Thus, besides a loss of information, the surface for converting the ions into electrons is discontinuous, with a resulting loss of spatial resolution. The ions which have struck the inner wall of a channel are converted into electrons, which are multiplied by rebounding in the channel. The electrons are extracted from the channel by means of the potential difference $\Delta V$ which exists between the inlet face of the microchannels and their outlet face. In general, the inlet face is raised to earth potential, while the outlet face is brought to a positive potential of a few kilovolts ($+3$ kV for example). The amplification factor of the electrons is in particular dependent on the potential different $\Delta V$ applied to the microchannels, the position of the ion trajectory relative to the corresponding channel, the local intensity of the beam of incident ions, etc. The configuration of the electron trajectories in the channels is dependent on the potential difference $\Delta V$. The number of impacts between the electrons and the walls of the channels is also dependent on this potential difference $\Delta V$. Consequently, the amplification is itself dependent on $\Delta V$. In order to have maximum detection, it is conventional practice to use plates with a maximum amplification factor. As a result, the plates operate under saturation conditions, no matter whether it is a question of detecting 1 ion or several ions with the same signal amplitude. The existing magnetic field does not modify the spatial resolution due to the existence of the channels. However, it plays an essential part in the amplification due to its non-homogeneous spatial distribution and its time non-reproducibility. Such a plate-type converter consequently does not make it possible to effect a proportional conversion of the ions into electrons. However, it should be noted that it has a very high sensitivity corresponding to a detection capacity of 1 ion. In general, it is standard practice to place a phosphorescent layer behind the plate-type converter which makes it possible to convert the electrons from the microchannels into photons. This phosphorescent layer is brought to a positive potential, whose absolute value is higher than that of the outlet face of the microchannels. Following the said phosphorescent layer, light guides, such as optical fibres, make it possible to capture the photons emitted by the phosphorescent layer and to channel them up to a reading window. The study of the spectrum of the photons is performed at the ends of the optical fibres. These fibres are in fact arranged in such a way that they retain a certain spatial resolution of the initial ionic phenomena. Reading of the spectrum takes place for example by means of a Vidicon sensing camera. However, it is necessary for the ion beams to be collected continuously or at least semi-continuously with a slow repetition level at the detector inlet in order to permit the sensing of the camera.

The conversion of the ions into electrons is not proportional, nor is the intensity of the photon spectrum lines obtained and the complete panoramic detector does not have a proportional response.

Another known detector making it possible to convert ions into electrons followed by a conversion of electrons into photons comprises electrical tapes or wires which are brought to a negative potential and which permit the conversion of ions into electrons. Each of the wires or tapes is associated with a microscintillator, making it possible to convert an electron into a photon. As in the previous case, this detection system has a discontinuous conversion surface. Thus, here again, there is a loss of spatial resolution in the detection of the ions. Moreover, this system requires a plurality of photomultipliers, so that it is scarcely more advantageous than the prior art system with microchannel detectors using a plurality of windowless electron multipliers and consequently its practical realization causes considerable difficulties, as a result of the size of the multipliers.

In order to eliminate this discontinuity in the spatial resolution of detectors, it is known to realize a conversion electrode which is unipolar and has a continuous structure. This electrode is generally brought to a negative potential and the ions strike it without previously being accelerated in the defined space. This negative potential makes it possible to accelerate the ion trapping phenomenon and to eliminate the rebound phenomena during the impact of said ions on the conversion electrode. The secondary electrons emitted as a result of impacts are channelled by an electrical field which is perpendicular to the plane of incidence of the ion beams. These electrons are then collected on a photographic plate after passing through a diaphragm brought to earth potential.

Although such a system makes it possible to obtain a continuous spatial resolution, it does not permit the elimination of the photographic plate. This plate can be replaced by a detector with a scintillator and photomultiplier, but in mass spectrography the use of a detector for multiplication and in particular electron—photon conversion is made impossible due to the overall dimensions of the multiplication elements which are incompatible with the coils for creating magnetic fields.

Another type of known detector involves placing a disk-shaped scintillator in the path of a single ion beam. In this detector the scintillator is covered by a thin metal film. The scintillator is only sensitive to high energy electrons and is insensitive to the positive ion to be analyzed. An accelerating electrode having an opening is placed between an ion source and the scintillator and makes it possible to convert the ions into electrons. Unfortunately, this detector does not prevent the entry of electrons which do not come directly from the ion—electron conversion and does not permit the spatial analysis of several ion beams.

BRIEF SUMMARY OF THE INVENTION

The problem of the present invention is to obviate these disadvantages and in particular to provide a panoramic detector which is able to effect a conversion of ions into electrons while retaining for the electron beams formed the same spatial distribution as for the beams of ion to be analyzed.

According to the invention this problem is solved by a panoramic detector of ions spatially distributed in different beams, wherein it comprises a plane symmetry diaphragm having an opening permitting the passage of said beams and which is brought to earth potential, an electrode for converting ions into electrons having an opening facing the diaphragm opening, said conversion electrode having the same plane of plane symmetry and being brought to a negative potential relative to the earth potential, and a planar electrode facing the conversion electrode and brought to a positive potential relative to the potential of the conversion electrode, the face of the conversion electrode facing the planar electrode having a predetermined shape in such a way that the electron beams formed retain the same spatial distribution as the beams of ion to be detected in the presence of an applied magnetic field.

According to special features, the conversion electrode is made from a copper-beryllium alloy and the planar electrode facing the conversion electrode is located on a scintillator which is able to convert the electrons into photons.

DESCRIPTION OF THE DRAWING AND PREFERRED EMBODIMENTS

Other features and advantages of the invention can be gathered from the following description of an exemplified and non-limitative embodiment of the detector according to the invention and with reference to the attached drawing, in which.

Figure 1A:
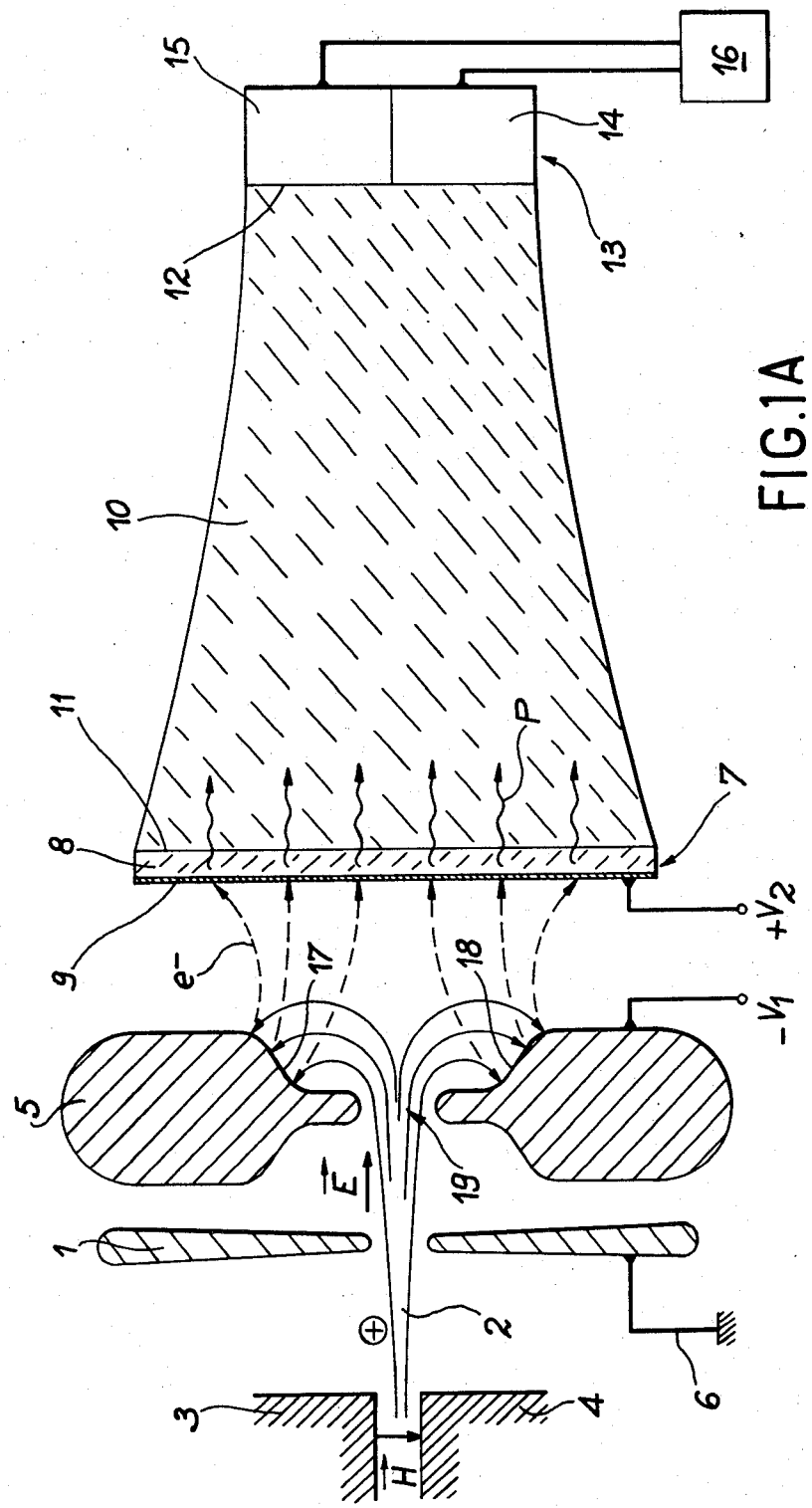
FIG. 1A is a section through a first embodiment of a detector according to the present invention.

The detector shown in the drawing is associated with a scintillator and means for guiding photons towards a photon detector and it can be used in a mass spectrograph as described in U.S. patent application Ser. No. 177,775, filed Aug. 13, 1980, by the present Applicants, U.S. Pat. No. 4,322,629 and which invention is a continuation of Ser. No. 958,721, filed Nov. 8, 1978.

In FIG. 1A, the detector comprises an intake diaphragm 1 for the ions which are shown in the form of a beam 2, emitted for example in a mass spectrograph, whereof are only shown the pole pieces 3 and 4 of an electromagnet permitting the magnetic analysis of the ions from the same ion source. The magnetic field H created by this electromagnet is indicated by an arrow. Each of the beams formed from ions of the same mass is substantially contained in the median plane of these pole pieces 3 and 4, perpendicular to the plane of the drawing. The detector also comprises means 5 for converting ions into electrons whereby said means have a continuous plane symmetry structure. Diaphragm 1 is brought to the potential of earth 6, while the means 5 for converting ions into electrons are brought to a negative potential with respect to the earth potential. These means for converting ions into electrons are in the form of planar electrodes made from a copper—beryllium alloy. The electrical field E between the diaphragm and these electrodes is directed generally parallel to the ion beam. Its intensity is such that the ions pass between the edges of the electrodes and strike the faces of the electrodes facing a planar electrode 9, which is brought to a positive potential with respect to earth. Electrode 9 is located on a scintillator 7 permitting a conversion of electrons into photons. Scintillator 7 has a planar structure and comprises a plastic support 8 covered with a very thin aluminum film 9 facing conversion electrode 5 and belonging to the panoramic detector. This film constitutes the planar electrode brought to positive potential $V_2$ with respect to earth potential. As an example, the negative potential $V_1$ to which are brought the electrodes of the means for converting into electrons is approximately 5 to 15 kV. The positive potential $V_2$ to which is brought the scintillator is approximately $+10$ to $+20$ kV. The thin aluminum film 9 covering plastic support 8 has a thickness equal to or below 200 Å.

In the present embodiment the plastic support 8 of scintillator 7 faces means 10 for guiding the photons emitted by scintillator 7. When the detector is to be used with the mass spectrograph forming the subject matter of the above indicated U.S. patent application, Ser. No. 177,775, U.S. Pat. No. 4,322,629 these photons guidance means have a monoblock structure and are for example made from a odorless, transparent resin. The synthetic resin is a methyl methacrylate polymer known under the trade name plexiglass. Their inlet faces 11 face scintillator 7, while their outlet face 12 faces the photon detector 13. In the present embodiment, photon detector 13 comprises two photomultipliers 14 and 15, one of which has a relatively low gain and the other a very high gain, so that the first photomultiplier is able to treat the ions corresponding to lines with a limited intensity and the second photomultiplier the intense lines. The output signals of the photomultipliers are applied to means 16 for rendering visible the photon spectrum. These visualisation means may either be a cathode tube oscilloscope or an analog-to-digital converter with display.

The monoblock photon guidance means 10 permitting the transmission of photons from the scintillator to the photomultiplier converge in the direction of the photomultipliers.

Thus, due to the detector according to the invention, ions are converted into electrons in a continuous manner. There is no spatial discontinuity in the detection of the ions. In the present embodiment, there is also no spatial discontinuity in the detection of the photons.

The ions to be collected and detected are post-accelerated by an electrical field E applied between the diaphragm and the electrode for converting the ions into electrons in such a way that the ions are only introduced into the space separating ions and electrons. When the ions reach this space, they are decelerated and deflected in such a way that they strike the conversion electrode surface with a high kinetic energy from the side which faces scintillator 7. This trajectory is obviously obtained due to the application of a negative potential, with respect to earth to electrode 5 and to the application of a positive potential, with respect to earth to electrode 9. The ions which strike the surface of the ion-electron conversion electrode with a certain kinetic energy remove the secondary electrons from said electrode. These secondary electrons are accelerated and strike the scintillator. The impacts of the secondary electrons produce scintillation phenomena in the scintillator, which give rise to the emissions of photons.

The edges 17, 18 of the opening of the conversion electrodes and which face the electrode 9 have a concave shape in such a way that due to the electrical field produced between the conversion electrode and the planar electrode 9, the spatial distribution of each beam of electrons corresponds to the spatial distribution of each beam of ions at the detector inlet. On leaving the conversion electrode, the electrons are subject to the action of magnetic field H, whose field lines extend up to this zone and then accelerated by an electrical field in the direction of the electrode of the scintillator. The electrical field lines on leaving the conversion electrode are directed in such a way that they permit the magnetic field H to group in parallel trajectories the electrons initially emitted in all directions. Thus, the electrons corresponding to a given ion beam have a minimum dispersion in the direction perpendicular to the plane of the drawing.

The face 11 of the photon guidance means 10 is in direct contact with the plastic support of the scintillator over an area equivalent to that of the electrodes for converting ions into electrons. The photons emitted by the scintillator are channelled and converge on an appropriate opening window of each of the photomultipliers 14, 15 so as to permit the reading of all the brightness information, due to visualization means 16 linked with said photon detector. Light guide 10 of the monoblock structure permits a spatial mixture of all the photon information, so that it is simultaneously possible to read the photon information due to one or more photomultipliers of different gains, such as 14, 15 disposed on the same light guide.

The detector described hereinbefore has the advantage of providing a very rapid analytical response. In mass spectrography this detector permits a simplified interpretation of the mass spectrum. The precision of the results is significantly improved. Thus, the electrons emitted during the first conversion do not return to strike the ion—electron conversion electrode, so that the said detector applied to mass spectrography does not have any danger of saturation, which exists in the case of the prior art multichannel detectors described hereinbefore. Moreover, the detector according to the invention has a detection limit which is approximately 1000 times higher than that of a photographic detector.

It should be noted that the shape of the downstream faces 17, 18 of conversion electrodes 5 is orthogonal to the magnetic field lines to which the said electrodes are subject. Thus, the electrical field lines and the magnetic field lines are colinear and the magnetic force is low compared with the electrostatic force and the minimum dispersion. The shape of the upstream faces of the conversion electrodes is substantially the same as that of the downstream faces. This shape permits the focusing of the ions between the lips of the conversion electrode.

It may be advantageous to place a magnetic shield around the detector in order to reduce in a first stage the dispersion effect of the electrons and then the detector according to the invention only has to eliminate the residual effect.

Moreover, the voltage applied between the diaphragm and the conversion electrode makes it possible to prevent electrons not resulting from the conversion of ions into electrons from mixing with the electrons resulting from said conversion and thus creating undesired incorrect information.

This arrangement and the resulting advantage is not limited to the application to ion detectors sensitive to a plurality of ion beams. It may also be applied to a monodetector in which case the diaphragm and the conversion electrode have a circular opening, the electrode and scintillator having for example the general shape of disks.

The panoramic detector according to the invention may be applied to a mass spectrograph with spatial separation and time of flight measurement. The retension of the spatial distribution of the ion beams and the secondary electron beams is indispensible in such spectrographs. Thus, in spectrographs which involve time of flight measurements, such as the spectrograph described in the above-mentioned U.S. patent application Ser. No. 177,775, if the detector according to the present invention had not been developed the trajectories of the electrons reemitted by the secondary emission electrode would differ widely according to the initial velocity of said electrons, so that the time taken by the electrons to reach the scintillator would be very different. This would lead to a stretching or widening of the electronic pulses corresponding to a given mass and therefore to a lack of time resolution.

Figure 1B:
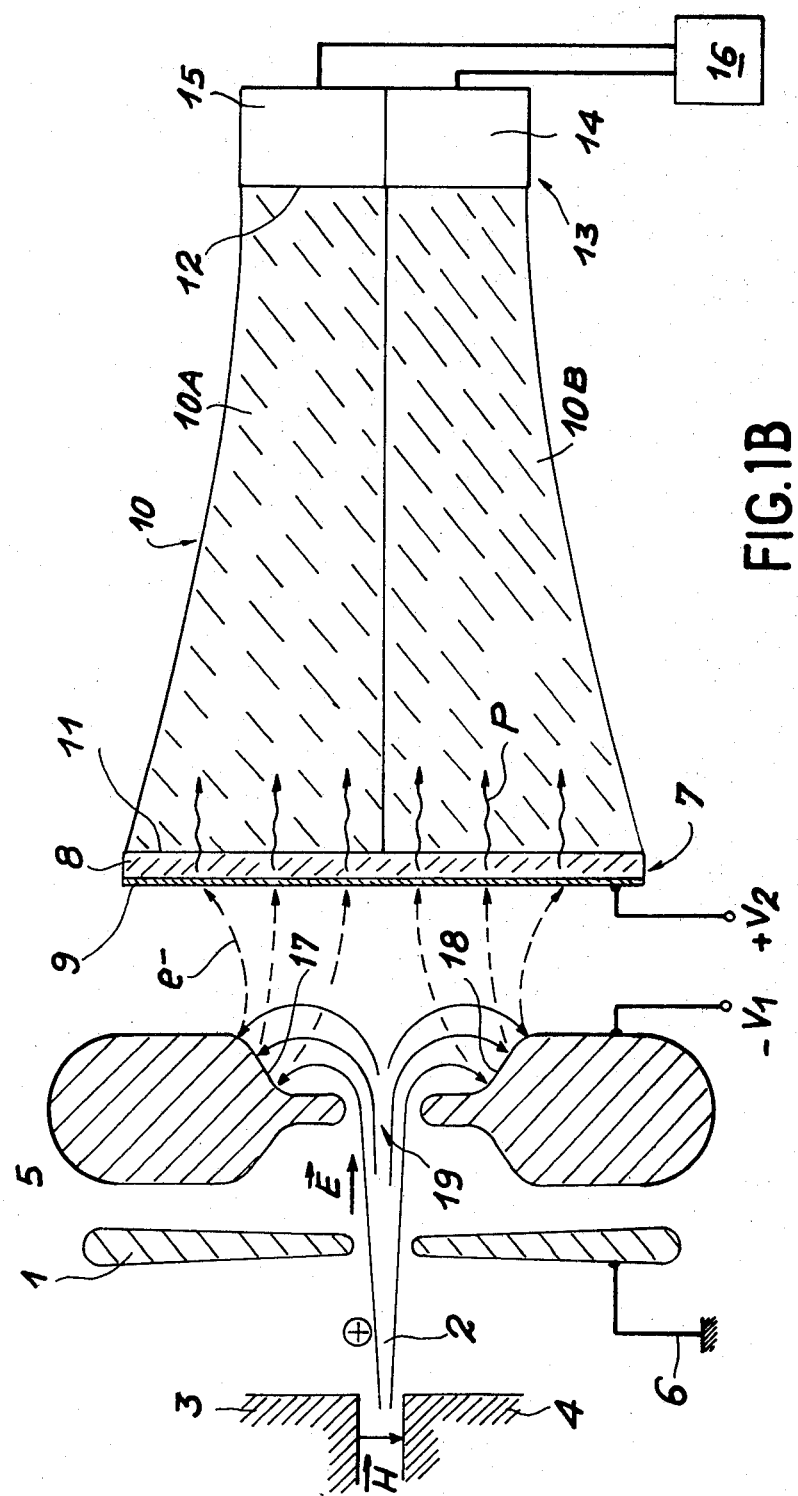
FIG. 1B is a section through a second embodiment of a detector according to the present invention.

Obviously, in the detector described hereinbefore, the means used could have been replaced by equivalent means without passing beyond the scope of the invention. For example, in the panoramic detector, the photon guidance means, which were chosen so as to have a monoblock structure, could be replaced by a plurality of optical fibres. Such an embodiment is illustrated in FIG. 1B. It is identical to the detector of FIG. 1A except that the light guide 10 consists of two light guides 10A and 10B and two photomultipliers 14, 15 each associated with a different light guide. This structure is applicable to the mass spectrograph described in the above-mentioned U.S. patent application, although in this case the spatial separation of the light beam is useless. If a plurality of photomultipliers of different gains is used, it is necessary for each scintillation zone corresponding to an ion beam of given mass to be connected to the inlet face of each of the photomultipliers.

What is claimed is:

1. A panoramic detector of ions spatially distributed in different beams, comprising a plane symmetry diaphragm having an elongated opening permitting the passage of said beams and being at earth potential, a conversion electrode for converting ions into electrons having an opening facing the diaphragm opening, said conversion electrode having the same plane of symmetry as said diaphragm and being at a negative potential relative to the earth potential, and a planar electrode facing the conversion electrode and being at a positive potential relative to the potential of the conversion electrode, the face of the conversion electrode facing the planar electrode having a predetermined shape in such a way that the electron beams formed retain the same spatial distribution as the beams of ion to be detected in the presence of an applied magnetic field.

2. A detector according to claim 1, wherein the conversion electrode is made from a copper—beryllium alloy.

3. A detector according to claim 1 including means for the differential treatment of electron beams emitted in different zones of said conversion electrode juxtaposed along the direction of the plane of symmetry, said means including a scintillator and a plurality of light guides, each associated with a different zone of said scintillator juxtaposed along the direction of the plane of symmetry.

4. A detector according to claim 3, wherein said treatment means also comprise a plurality of photomultipliers, each of which is associated with one of the light guides.

5. A detector according to claim 1, comprising means for the time treatment of the electrooptical signals emitted by the conversion electrode.

6. A detector according to claim 5, wherein said treatment means comprise a scintillator and a light guide associated with the scintillator assembly.

7. A detector according to claim 5, wherein said treatment means comprise at least one photomultiplier associated with said light guide.

* * * * *